(12) United States Patent
Liu et al.

(10) Patent No.: US 12,359,037 B2
(45) Date of Patent: Jul. 15, 2025

(54) VULCANIZING AGENT-MODIFIED GRAPHENE PREPARED THROUGH AN IN-SITU CHEMICAL DEPOSITION PROCESS, AND CONTROLLABLE CROSSLINKED NATURAL RUBBER COMPOSITE COMPRISING THE SAME

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Xiaoyuan Duan, Taiyuan (CN); Guizhe Zhao, Taiyuan (CN); Shuaishuai Cheng, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 412 days.

(21) Appl. No.: 17/895,979

(22) Filed: Sep. 9, 2022

(65) Prior Publication Data
US 2022/0403133 A1 Dec. 22, 2022

(30) Foreign Application Priority Data
Jan. 22, 2022 (CN) .................. 202210075239.X

(51) Int. Cl.
| | | |
|---|---|---|
| *C08K 3/04* | (2006.01) | |
| *B60C 1/00* | (2006.01) | |
| *C08J 3/22* | (2006.01) | |
| *C08K 3/06* | (2006.01) | |
| *C08K 9/06* | (2006.01) | |

(52) U.S. Cl.
CPC .............. *C08K 3/042* (2017.05); *B60C 1/00* (2013.01); *C08J 3/226* (2013.01); *C08K 3/06* (2013.01); *C08K 9/06* (2013.01); *C08J 2307/00* (2013.01); *C08K 2201/001* (2013.01); *C08K 2201/002* (2013.01)

(58) Field of Classification Search
None
See application file for complete search history.

(56) References Cited

FOREIGN PATENT DOCUMENTS

| CN | 110343299 A | 10/2019 |
|---|---|---|
| CN | 112759807 A | 5/2021 |
| CN | 113502000 A | 10/2021 |

OTHER PUBLICATIONS

Zhao et al. Carbon Fiber Grafted with Nanodiamond: Preparation and Characterization J. Nanosci. Nanotechnol. vol. 15, No. 8 p. 5807-5815 (Year: 2015).*
Zhen et al. A Functional Modified Graphene Oxide/Nanodiamond./Nano Zinc Oxide Composite for Excellent Vulcanization Properties of Natural Rubber RSC Adv 10 41857-41870 (Year: 2020).*

* cited by examiner

*Primary Examiner* — Katarzyna I Kolb

(57) ABSTRACT

A vulcanizing agent-modified graphene prepared through an in-situ chemical deposition process and a controllable crosslinked natural rubber composite containing the same. In the preparation of the vulcanizing agent-modified graphene, graphene oxide is coated on a spherical thermal-conductive functional particle through the chemical bonding to obtain a 3D graphene particle; and a vulcanizing agent is adsorbed on the 3D graphene particle through π-π conjugation by an in-situ chemical deposition process to obtain a vulcanizing agent-modified graphene particle. Further, the vulcanizing agent-modified graphene particle is mixed with natural rubber latex, and undergoes synergistic coagulation in water to form a graphene masterbatch, which is further processed into the controllable crosslinked natural rubber composite by adding a certain amount of natural rubber block, rubber additive and reinforcing filler.

6 Claims, 2 Drawing Sheets

VULCANIZING AGENT-MODIFIED GRAPHENE PREPARED THROUGH AN IN-SITU CHEMICAL DEPOSITION PROCESS, AND CONTROLLABLE CROSSLINKED NATURAL RUBBER COMPOSITE COMPRISING THE SAME

CROSS-REFERENCE TO RELATED APPLICATIONS

This application claims the benefit of priority from Chinese Patent Application No. 202210075239.X, filed on Jan. 22, 2022. The content of the aforementioned application, including any intervening amendments thereto, is incorporated herein by reference in its entirety.

TECHNICAL FIELD

This application relates to functional natural rubber composites, and more particularity to a vulcanizing agent-modified graphene prepared through an in-situ chemical deposition process and a controllable crosslinked natural rubber composite comprising the same.

BACKGROUND

Natural rubber has been widely used in various fields of the national economy due to its excellent mechanical properties, tear resistance, elasticity, etc. Nevertheless, it is usually required to compound the natural rubber with fillers to obtain the desired modulus, tear resistance, and thermal conductivity. Natural rubber is mainly used in the manufacturing of tires, whereas, due to its poor thermal conductivity, the heat build-up inside the tires made of natural rubber cannot be transferred in time, resulting in a temperature rise inside the tire and shortening its service life.

Considering their excellent mechanical strength, electrical and thermal conductivity, graphene and its derivatives have been extensively applied to the rubber modification to enhance the mechanical strength, toughness and thermal conductivity of the rubber. Particularly, the oxygen-containing functional groups on the surface of the graphene oxide enable it to be compounded with other functional particles to modify the rubber synergistically. For example, the graphene oxide can form chemical bonding with the amino group on the surface of an aminated thermal-conductive particle via its surface carboxyl and hydroxyl groups, and thus the graphene oxide is coated on the thermal-conductive functional particle. Further, the vulcanizing agent is chemically deposited in situ on the compound particle to obtain the vulcanizing agent-modified three-dimensional (3D) graphene particle. Compared to the ordinary graphene oxide, the vulcanizing agent-modified 3D graphene particle has an optimized structure, such that a larger contact area with the rubber matrix is achieved. Moreover, for the rubber composite containing a vulcanizing agent-modified 3D graphene particle, there is a more effective crosslinked network formed on the surface of the 3D graphene particle, thus significantly improving the properties of the rubber composite.

SUMMARY

An object of this application is to provide a vulcanizing agent-modified graphene particle prepared through an in-situ chemical deposition process and a controllable crosslinked natural rubber composite comprising the same. The vulcanizing agent is attached to the surface of graphene sheet by an in-situ chemical deposition process, so that it is easy to be evenly distributed in the natural rubber matrix. On the one hand, the interfacial interaction between the graphene particle and the natural rubber matrix is effectively enhanced; on the other hand, the crosslinking density, and the location of crosslinking points of the natural rubber composite can be effectively regulated, then significantly enhancing the low heat build-up performance, thermal conductivity, and mechanical properties of the natural rubber composite, and extending the service life of the natural rubber products.

Technical solutions of the present disclosure are described as follows.

In a first aspect, this application provides a method for preparing a vulcanizing agent-modified graphene particle through an in-situ chemical deposition process, comprising:
(1) aminating a spherical thermal-conductive functional particle to obtain an aminated spherical thermal-conductive functional particle;
(2) coating graphene oxide on a surface of an aminated spherical thermal-conductive functional particle through chemical bonding of the carboxyl group and the hydroxyl group on the graphene oxide with the amino group on the aminated spherical thermal-conductive functional particle, so as to obtain a three-dimensional (3D) graphene particle; and
(3) depositing a vulcanizing agent on the 3D graphene particle to obtain a vulcanizing agent-modified graphene particle, wherein the vulcanizing agent is adsorbed on a surface of the 3D graphene particle through π-π conjugation.

In some embodiments, step (1) is performed through steps of:
adding a spherical thermal-conductive functional particle into an alkaline solution followed by a reaction at 70-120° C. for 8-24 h to obtain a hydroxylated spherical thermal-conductive functional particle; subjecting a silane coupling agent having a terminal amino group to hydrolysis to convert an alkyl group to an alcoholic hydroxyl group, so as to obtain a hydrolyzed silane coupling agent; mixing the hydroxylated spherical thermal-conductive functional particle with the hydrolyzed silane coupling agent, and reacting an alcoholic hydroxyl group of the hydrolyzed silane coupling agent with a hydroxyl group on the surface of the hydroxylated spherical thermal-conductive functional particle to graft a terminal amino group-carrying carbon chain of the hydrolyzed silane coupling agent onto the surface of the hydroxylated spherical thermal-conductive functional particle, so as to obtain an aminated spherical thermal-conductive functional particle;

the step (2) is performed through steps of:
adding a carboxyl activator and an amidation catalyst into a graphene oxide aqueous dispersion; adding the aminated spherical thermal-conductive functional particle into the graphene oxide aqueous dispersion; and subjecting an amino group on the aminated spherical thermal-conductive functional particle and an activated carboxyl group on a surface of the graphene oxide to amidate to obtain a 3D graphene particle; and the step (3) is performed through steps of:
preparing an aqueous dispersion of the 3D graphene particle; dropwise adding a solution of a sulfur-containing compound and a reducing agent at a preset temperature to allow deposition of elemental sulfur on the 3D graphene particle, so as to obtain a vulcanizing agent-modified graphene particle, wherein a carboxyl group and a hydroxyl group on a surface of the 3D graphene oxide not only play a role as a nucleus for the precipitation of the elemental sulfur, but also play a role of adsorbing the elemental sulfur, such that the elemental sulfur is deposited in situ on the surface of the 3D graphene oxide.

In some embodiments, the spherical thermal-conductive functional particle is selected from the group consisting of aluminum oxide, silicon carbide, silicon dioxide, aluminum nitride, magnesium oxide, and a combination thereof.

In some embodiments, the sulfur-containing compound is selected from the group consisting of sodium sulfate, sodium thiosulfate, sodium persulfate, disulfur dichloride, sulfur dichloride, sulfur tetrachloride, and a combination thereof.

In some embodiments, a mass ratio of the graphene oxide to the carboxyl activator to the amidation catalyst is 1:0.02:0.02.

In a second aspect, this application provides a controllable crosslinked natural rubber composite, comprising:

100 parts by weight of natural rubber, 1-10 parts by weight of a vulcanizing agent-modified graphene particle prepared by the above-mentioned method, 11 parts by weight of a rubber additive, and 0-120 parts by weight of a reinforcing filler.

In a third aspect, this application provides a method for preparing the controllable crosslinked natural rubber composite, comprising:

(S1) dispersing a vulcanizing agent-modified graphene particle with deionized water followed by an addition of a natural rubber latex and even mixing to produce a graphene-natural latex mixing system, wherein the vulcanizing agent-modified graphene particle is combined with the rubber particle to keep stable due to an electrostatic effect of the negative charge ionized by the protein-phospholipid membrane on the rubber particle; adding a flocculant to the graphene-natural rubber latex mixing system to obtain a graphene-rubber precipitate, wherein a negative charge repulsion between rubber particles decreases in the presence of the flocculant to trigger flocculation; and the rubber particles with the destroyed protective layer and the vulcanizing agent-modified graphene particles adsorb to each other through π-π interaction, such that the composite particles and rubber particles are agglomerated and precipitated in an ordered manner; and subjecting the graphene-rubber precipitate to washing, dewatering and drying to obtain a vulcanizing agent-modified graphene masterbatch;

(S2) adding a natural rubber block to an internal mixer followed by mixing with an anti-aging agent, an antioxidant, an activator, a softener and a reinforcing filler at a preset temperature for a preset period to obtain a first rubber compound, wherein the anti-aging agent, antioxidant, activator, softener and reinforcing filler are sequentially added;

(S3) transferring the first rubber compound to an open mill followed by mixing sequentially with the vulcanizing agent-modified graphene masterbatch and a vulcanization accelerator and milling until there is no air bubble, so as to obtain a second rubber compound; and (S4) subjecting the second rubber compound to standing for a preset period followed by a vulcanization step to obtain a controllable crosslinked natural rubber composite, wherein rubber molecular chains are crosslinked with sulfur loaded on the vulcanizing agent-modified graphene particle as a crosslinking point to form a 3D network structure.

In some embodiments, a mass ratio of the anti-aging agent to the antioxidant to the activator to the softener to the vulcanization accelerator is 1:1:5:2:2

Compared to the prior art, this application has the following beneficial effects.

(1) By means of the method provided herein, the dispersion of the vulcanizing agent in the rubber composite is enhanced, and the crosslinking density and location of crosslink points in the natural rubber composite can be effectively regulated, improving the interfacial interaction between rubber molecular chains and the functional fillers. In consequence, the obtained natural rubber composite still has good thermal conductivity, excellent mechanical properties, and low heat build-up at a lower filling level of functional particle fillers, alleviating the thermal aging and extending the service life of the rubber article.

(2) The methods provided herein have simple operation and mild reaction conditions, and thus are suitable for industrialization.

BRIEF DESCRIPTION OF THE DRAWINGS

Technical solutions of the present disclosure and the prior art will be described below with reference to the accompanying drawings to facilitate the understanding. Obviously, illustrated in the accompanying drawings are merely some embodiments of the present disclosure, which are not intended to limit the disclosure. Other drawings can be obtained by those skilled in the art based on the drawings provided herein without paying creative effort.

Figure 1A:
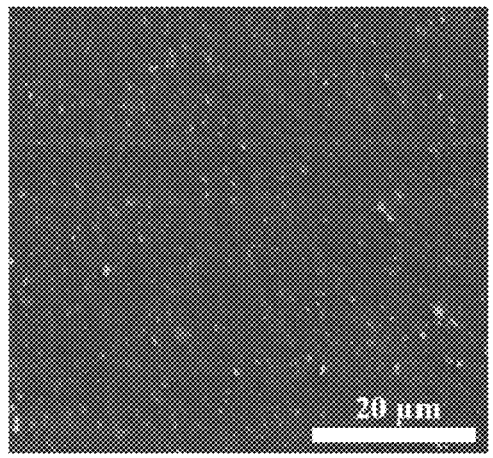
FIG. 1A is a scanning electron microscopy (SEM) image of a section of a controllable crosslinked natural rubber composite prepared in Example 1.
Figure 1B:
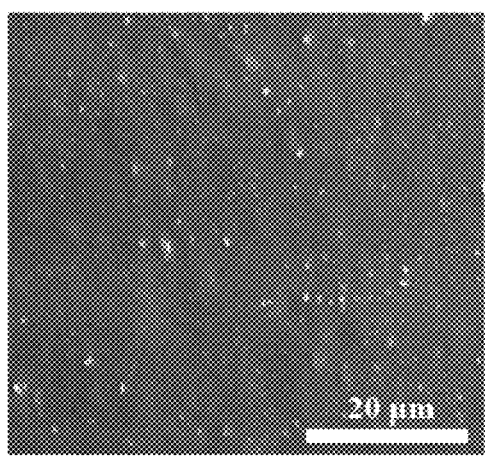
FIG. 1B is a SEM image of a section of a 3D graphene-natural rubber composite prepared in Comparative Example 1.
Figure 1C:
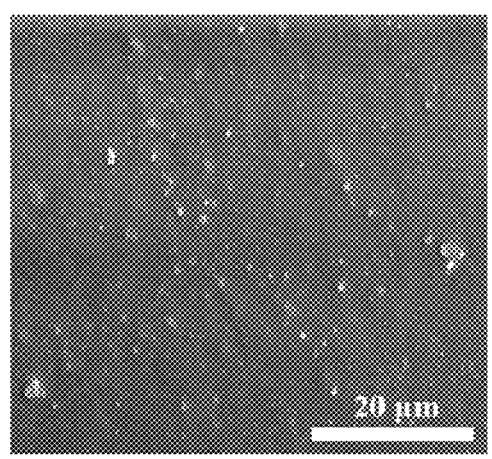
FIG. 1C is a SEM image of a section of a graphene oxide-natural rubber composite prepared in Comparative Example 2.
Figure 1D:
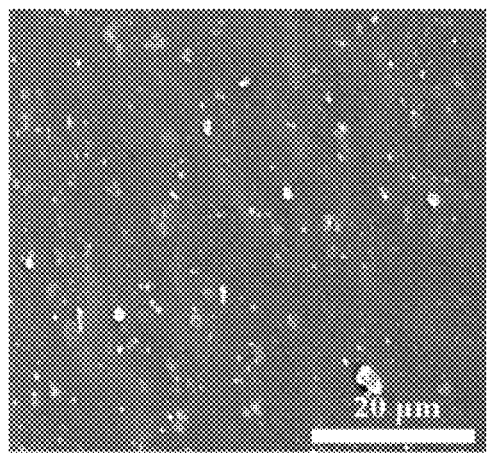
FIG. 1D is a SEM image of a section of a silicon carbide-natural rubber composite prepared in Comparative Example 3.
Figure 2A:
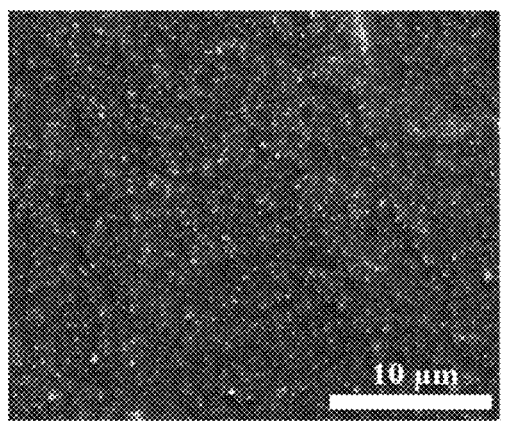
FIG. 2A is a SEM image of a section of a controllable crosslinked natural rubber composite prepared in Example 2.
Figure 2B:
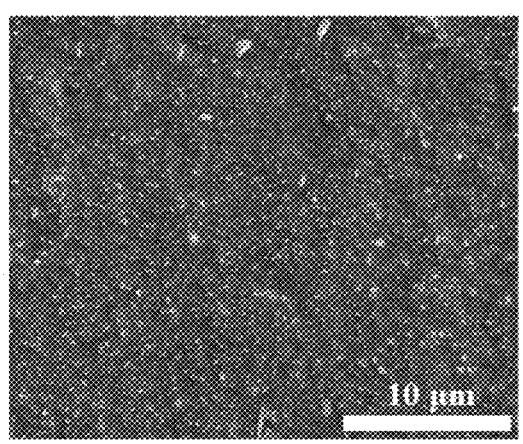
FIG. 2B is a SEM of a section of a 3D graphene-natural rubber composite prepared in Comparative Example 4.

As illustrated by FIGS. 1A-1D and 2A-2B, rubber composites prepared through the method of the present disclosure have more uniform dispersion of fillers, indicating a better rubber modification effect.

DETAILED DESCRIPTION OF EMBODIMENTS

Technical solutions of the present disclosure and the prior art will be described below with reference to the accompanying drawings and embodiments to facilitate the understanding. Obviously, described below are merely some embodiments of the present disclosure, which are not intended to limit the disclosure. Other embodiments obtained by those skilled in the art based on the embodiments provided herein without paying creative effort should fall within the scope of the disclosure.

This application provides a method for preparing a vulcanizing agent-modified graphene particle through an in-situ chemical deposition process, including:

(1) aminating a spherical thermal-conductive functional particle to obtain an aminated spherical thermal-conductive functional particle;

(2) coating graphene oxide on a surface of the aminated spherical thermal-conductive functional particle through the chemical bonding of the carboxyl group and the hydroxyl group on the graphene oxide with the amino group on the aminated spherical thermal-conductive functional particle, so as to obtain a three-dimensional (3D) graphene particle; and (3) depositing a vulcanizing agent on the 3D graphene particle to obtain a vulcanizing agent-modified graphene particle, where the vulcanizing agent is adsorbed on a surface of the 3D graphene particle through $\pi$-$\pi$ conjugation.

Compared to the 2D graphene oxide, the vulcanizing agent-modified 3D graphene particle has an optimized structure, such that a larger contact area with a rubber matrix is achieved.

In an embodiment, the spherical thermal-conductive functional particle is selected from the group consisting of aluminum oxide, silicon carbide, silicon dioxide, aluminum nitride, magnesium oxide, and a combination thereof. Obviously, other spherical thermal-conductive functional particles are also feasible.

In an embodiment, the step (1) is performed through steps of:

adding a spherical thermal-conductive functional particle into an alkaline solution followed by a reaction at a preset temperature for a preset period to obtain a hydroxylated spherical thermal-conductive functional particle; subjecting a silane coupling agent having a terminal amino group to hydrolysis to convert an alkyl group to an alcoholic hydroxyl group, so as to obtain a hydrolyzed silane coupling agent; mixing the hydroxylated spherical thermal-conductive functional particle with the hydrolyzed silane coupling agent, and reacting an alcoholic hydroxyl group of the hydrolyzed silane coupling agent with a hydroxyl group on the surface of the hydroxylated spherical thermal-conductive functional particle to graft a terminal amino group-carrying carbon chain of the hydrolyzed silane coupling agent onto the surface of the hydroxylated spherical thermal-conductive functional particle, so as to obtain an aminated spherical thermal-conductive functional particle;

the step (2) is performed through steps of:

adding a carboxyl activator and an amidation catalyst into a graphene oxide aqueous dispersion; adding the aminated spherical thermal-conductive functional particle into the graphene oxide aqueous dispersion; and subjecting an amino group on the aminated spherical thermal-conductive functional particle and an activated carboxyl group on a surface of the graphene oxide to amidate to obtain a 3D graphene particle; and the step (3) is performed through steps of:

preparing an aqueous dispersion of the 3D graphene particle; dropwise adding a solution of a sulfur-containing compound and a reducing agent at a preset temperature to allow deposition of elemental sulfur on the 3D graphene particle, so as to obtain a vulcanizing agent-modified graphene particle, where a carboxyl group and a hydroxyl group on a surface of the 3D graphene oxide not only play a role as a nucleus for the precipitation of the elemental sulfur, but also play a role of adsorbing the elemental sulfur, such that the elemental sulfur is deposited in situ on the surface of the 3D graphene oxide.

In the step (1), the alkaline solution is sodium hydroxide solution, potassium hydroxide solution, or ammonia water; a reaction to obtain a hydroxylated spherical thermal-conductive functional particle is performed at 70-120° C. for 8-24 h; the silane coupling agent is N-($\beta$-aminoethyl)-$\gamma$-aminopropyltrimethoxysilane or $\gamma$-aminopropyltriethoxysilane; the hydroxylated spherical thermal-conductive functional particle is reacted with the hydrolyzed silane coupling agent at 70-80° C. for 4-24 h.

In the step (2), the carboxyl activator, the amidation catalyst, and the graphene oxide aqueous dispersion are mixed at 0-20° C.; the aminated spherical thermal-conductive functional particle is added into the graphene oxide aqueous dispersion for reacting 8-24 h.

In an embodiment, the carboxyl activator is 1-(3-Dimethylaminopropyl)-3-ethylcarbodiimide hydrochloride (EDC) or N, N-dicyclohexylcarbodiimide; and the amidation catalyst is N-hydroxysuccinimide (NHS) or 4-dimethylaminopyridine.

In the step (S3), after adding the reducing agent, precipitation is performed at 20-50° C. for 2-6 h; and the reducing agent is hydrochloric acid, acetic acid, or ascorbic acid.

In an embodiment, the spherical thermal-conductive functional particle is selected from the group consisting of aluminum oxide, silicon carbide, silicon dioxide, aluminum nitride, magnesium oxide, and a combination thereof.

In an embodiment, a mass ratio of the graphene oxide to the carboxyl activator to the amidation catalyst is 1:0.02:0.02.

This application also provides a controllable crosslinked natural rubber composite, including:

100 parts by weight of natural rubber, 1-10 parts by weight of a vulcanizing agent-modified graphene particle, 11 parts by weight of a rubber additive, and 0-120 parts by weight of a reinforcing filler.

This application further provides a method for preparing a controllable crosslinked natural rubber composite, including:

(S1) dispersing a vulcanizing agent-modified graphene particle with deionized water followed by an addition of a natural rubber latex and even mixing to produce a graphene-natural latex mixing system, where the vulcanizing agent-modified graphene particle is combined with the rubber particle to keep stable due to an electrostatic effect of the negative charge ionized by the protein-phospholipid membrane on the rubber particle; adding a flocculant into the graphene-natural rubber, latex mixing system to obtain a graphene-rubber precipitate, where the negative charge repulsion between rubber particles decreases in the presence of the flocculant to trigger flocculation; and the rubber particles with the destroyed protective layer and the vulcanizing agent-modified graphene particles adsorb to each other through $\pi$-$\pi$ interaction, such that the composite particles and rubber particles are agglomerated and precipitated in an ordered manner; and subjecting the graphene-rubber precipitate to washing, dewatering and drying to obtain a vulcanizing agent-modified graphene masterbatch;

(S2) adding a natural rubber block to an internal mixer followed by mixing with an anti-aging agent, an antioxidant, an activator, a softener, and a reinforcing filler at a preset temperature for a preset period to obtain a first rubber compound, where the anti-aging agent, antioxidant, activator, softener and reinforcing filler are sequentially added;

(S3) transferring the first rubber compound to an open mill followed by mixing sequentially with the vulcanizing agent-modified graphene masterbatch and a vulcanization accelerator and milling until there is no air bubble, so as to obtain a second rubber compound; and (S4) subjecting the second rubber compound to standing for a preset period followed by a vulcanization step to obtain a controllable crosslinked natural rubber composite, wherein rubber molecular chains are crosslinked with sulfur loaded on the vulcanizing agent-modified graphene particle as a crosslinking point to form a 3D network structure.

In an embodiment, the vulcanization accelerator is N-tert-butyl-2-benzothiazolesulfenamide, N-cyclohexylbenzothiazole-2-sulphenamide or N-(Oxidiethylene)-2-benzothiazolyl sulfenamide (NOBS); the anti-aging agent is 2,6-di-tert-butyl-4-methylphenol, poly(1,2-dihydro-2,2,4-trimethylquinoline) (RD) or 2-mercaptobenzimidazole; the antioxidant is N-isopropyl-N'-phenyl-p-phenylenediamine (4010NA), 4-phenyl aniline, or dilauryl thiodipropionate; the activator is zinc gluconate, zinc oxide or magnesium oxide; the softener is stearic acid (SA), di-n-butyl phthalate, or dioctyl adipate; the reinforcing filler is carbon black or white carbon black; and the flocculant is calcium chloride, aluminum chloride or acetic acid.

In an embodiment, a mass ratio of the anti-aging agent to the antioxidant to the activator to the softener to the vulcanization accelerator is 1:1:5:2:2.

In the step (S1), a concentration of the dispersion is 0.5-5 mg/mL.

In the step (S2), the preset temperature for the mixing of the natural rubber block in the internal mixer is performed at 105-120° C. for 3-5 min.

In the step (S3), the mixing in the open mill is performed at 50-70° C. for 8-12 min.

In the step (S4), the standing lasts for 18-36 h; the vulcanization is performed at 135-170° C. and 10-30 MPa for 10-25 min.

Provided is an application of the vulcanizing agent-modified graphene particle through an in-situ chemical deposition process in a preparation of a controllable crosslinked natural rubber composite.

The technical solutions of the disclosure will be further described below with reference to embodiments.

Example 1

Provided herein was a method for preparing a controllable crosslinked natural rubber composite, which was performed as follows.

(S1) Preparation of aminated silicon carbide

Silicon carbide nanoparticles were added to the solution of 5 mol/L sodium hydroxide, reacted at 85° C. for 12 h for hydroxylation, washed and dried to obtain the hydroxylated silicon carbide nanoparticles. The hydroxylated silicon carbide nanoparticles were added to a solution of 5 wt. % γ-aminopropyltriethoxysilane in an ethanol-water mixture, reacted at 75° C. for 8 h, cooled, washed to remove the unreacted silane coupling agent, and dried to obtain the aminated silicon carbide nanoparticles.

(S2) Preparation of 3D graphene particles

EDC and NHS were sequentially added to the aqueous dispersion of 5 mg/mL graphene oxide at 0° C. under stirring, where the mass ratio of graphene oxide to EDC to NHS was 1:0.02:0.02. The reaction mixture was added with the aminated silicon carbide nanoparticles, reacted for 12 h, washed to remove unreacted EDC and NHS, and subjected to vacuum freeze drying for 24 h to obtain the 3D graphene particles, where the mass ratio of the graphene oxide to the aminated silicon carbide nanoparticle was 1:4.

(S3) Preparation of vulcanizing agent-modified 3D graphene particles

The 3D graphene particles obtained in the step (S2) were dispersed in water to obtain the dispersion of 3.3 mg/mL 3D graphene particle, to which the solution of 1.56 mmol/mL sodium thiosulfate was added and mixed evenly, where the mass ratio of the 3D graphene particle to sodium thiosulfate was 1:6. Then the reaction mixture was dropwise added with the 2.3 mmol/mL hydrochloric acid, mixed for 2 h, washed and subjected to vacuum freeze drying for 24 h to obtain the vulcanizing agent modified 3D graphene particles, where the molar ratio of the sodium thiosulfate to hydrochloric acid was 1:2.

(S4) The vulcanizing agent-modified 3D graphene particles were dispersed in water to obtain the dispersion of 5 mg/mL, which was then added to 250 g of natural rubber latex with the solid content of 20 wt. %. The reaction mixture was mixed evenly, added with a calcium chloride solution for flocculation, washed with water to remove calcium chloride, and dried at 80° C. to obtain a vulcanizing agent-modified graphene masterbatch.

(S5) 50 g of a natural rubber block was added to an internal mixer, added with 1 g of antioxidant 4010NA, 1 g of anti-aging agent RD, 5 g of activator ZnO, and 2 g of softener SA in three times, and mixed at 110° C. for 4 min each time, so as to obtain the first rubber compound.

(S6) The first rubber compound was cooled to room temperature and transferred to an open mill, milled at 60° C., sequentially added with the vulcanizing agent-modified graphene masterbatch obtained in the step (S4) and 2 g of vulcanization accelerator NOBS, mixed evenly and milled until there was no air bubble to obtain the second rubber compound.

(S7) The second rubber compound was subjected to standing for 24 h, and vulcanization in a vulcanizing machine at 150° C. and 15 MPa for a preset period (t90, referring to the optimum cure time) to obtain the controllable crosslinked natural rubber composite, where t90 was obtained through a rubber processing analyzer (RPA).

Example 2

The Example 2 was performed basically according to the steps of Example 1.

In the step (S5), at the last time of mixing, 50 g of reinforcing filler carbon black N330 were added to the internal rubber mixer and mixed for 4 min, so as to obtain the controllable crosslinked natural rubber composite for tires.

The controllable crosslinked natural rubber composite of Example 1 and the controllable crosslinked natural rubber composite of Example 2 were tested for heat build-up, thermal conductivity, and mechanical properties. Heat build-up was tested according to GB/T 1687.1-2016 (China). Thermal conductivity was tested according to GB/T 3399 (China). Mechanical properties were tested according to ISO 37-2005. A tensile rate was 500 mm/min.

The compositions of Examples 1 and 2 are shown in Table 1, and performance test results are shown in Table 2.

Comparative Example 1

The Comparative Example 1 was performed basically according to the steps of Example 1 without the step (S3).

In the step (S4), the 3D graphene particles, rather than the vulcanizing agent-modified 3D graphene particles, were dispersed in water. Accordingly, in the step (S6), 2 g of sulfur were added to the mixture after vulcanization accelerator NOBS was mixed evenly, so as to obtain the 3D graphene/natural rubber composite.

Comparative Example 2

(S1) Graphene oxide was dispersed in water to obtain an aqueous dispersion of 5 mg/mL graphene oxide.

The following steps of the Comparative Example 2 were performed basically according to the steps (S4)-(S7) of Example 1. Whereas, in the step (S4), graphene oxide particles, rather than the vulcanizing agent-modified 3D graphene particles, were dispersed in water. Accordingly, in the step (S6), 2 g of sulfur were added to the mixture after vulcanization accelerator NOBS was mixed evenly, so as to obtain the graphene oxide/natural rubber composite.

Comparative Example 3

Comparative Example 3 was performed basically according to the steps of Comparative Example 2. Whereas, silicon carbide, rather than graphene oxide, was dispersed in water, so as to obtain the silicon carbide/natural rubber composite.

Comparative Example 4

Comparative Example 4 was performed basically according to the steps of Comparative Example 1. Whereas, in the step (S5), in the last time of mixing, 50 g of the reinforcing filler carbon black N330 were added to the internal rubber mixer, and mixed for 4 min, so as to obtain the 3D graphene/natural rubber composite for tires.

The compositions of Comparative Examples 1-4 are shown in Table 1, and performance test results are shown in Table 2.

TABLE 1

Compositions of Examples 1-2 and Comparative Examples 1-4

| Sample | Example 1 | Example 2 | Comparative Example 1 | Comparative Example 2 | Comparative Example 3 | Comparative Example 4 |
|---|---|---|---|---|---|---|
| Natural rubber (phr) | 100 | 100 | 100 | 100 | 100 | 100 |
| Graphene oxide (phr) | — | — | — | 2 | — | — |
| Silicon carbide (phr) | — | — | — | — | 2 | — |
| 3D graphene particle (phr) | — | — | 2 | — | — | 2 |
| Modified 3D graphene particle (phr) | 2 | 2 | — | — | — | — |
| 4010NA (phr) | 1 | 1 | 1 | 1 | 1 | 1 |
| RD (phr) | 1 | 1 | 1 | 1 | 1 | 1 |
| Zinc oxide (phr) | 5 | 5 | 5 | 5 | 5 | 5 |
| Stearic acid (phr) | 2 | 2 | 2 | 2 | 2 | 2 |
| Carbon black (phr) | — | 50 | — | — | — | 50 |
| NOBS (phr) | 2 | 2 | 2 | 2 | 2 | 2 |
| Sulfur (phr) | — | — | 2 | 2 | 2 | 2 |

TABLE 2

Performance test results

| Sample | Example 1 | Comparative Example 1 | Comparative Example 2 | Comparative Example 3 | Example 2 | Comparative Example 4 |
|---|---|---|---|---|---|---|
| Tensile strength (MPa) | 27.5 | 25.5 | 23.7 | 21.0 | 25.6 | 24.7 |
| Breaking elongation (%) | 635 | 568 | 533 | 440 | 514 | 483 |
| Tear strength (N/mm) | 35.2 | 32.5 | 30.7 | 24.6 | 73.5 | 71.3 |
| Hardness (HA) | 49.0 | 47.5 | 45.0 | 46.5 | 68.0 | 65.0 |
| Thermal conductivity ($Wm^{-1}K^{-1}$) | 0.33 | 0.27 | 0.24 | 0.25 | 0.48 | 0.41 |
| Heat build-up (° C.) | 2.8 | 3.2 | 4.6 | 5.3 | 25.2 | 28.7 |

It can be observed from Table 2 that compared with the graphene oxide/natural rubber composite, and the silicon carbide/natural rubber composite, the controllable crosslinked natural rubber composite by compounding with thermal-conductive functional particles and reinforcing with 3D graphene oxide particles modified with a vulcanizing agent has excellent mechanical properties, thermal conductivity, and low heat build-up. Due to the thermal-conductive functional particles and the 3D graphene oxide particles modified with a vulcanizing agent, the structural degree of the filler is enhanced, making a larger contact area with rubber. In addition, the 3D graphene oxide particles are more conducive to forming thermal conductivity pathways than 2D graphene oxide, thereby improving the thermal conductivity of natural rubber. Furthermore, the vulcanizing agent is subjected to an in-situ chemical deposition process on the surface of those graphene particles, making a more uniform dispersion of vulcanizing agent, a better uniformity of rubber crosslinking, and effectively enhancing interaction between the graphene particles and the natural rubber chains. In consequence, the natural rubber composite provided herein has good thermal conductivity, mechanical properties, and low heat build-up at less functional particle fillers, thus slowing product thermal aging and extending its duration.

Described above are merely preferred embodiments of the disclosure, which are illustrative and are not intended to limit the disclosure. It should be understood that any modifications and replacements made by those skilled in the art without departing from the spirit and scope of the disclosure should fall within the scope of the disclosure defined by the appended claims.

What is claimed is:

1. A method for preparing a vulcanizing agent-modified graphene particle through an in-situ chemical deposition process, comprising:

(1) aminating a spherical thermal-conductive functional particle to obtain an aminated spherical thermal-conductive functional particle;

(2) coating graphene oxide on a surface of the aminated spherical thermal-conductive functional particle through chemical bonding of a carboxyl group and a hydroxyl group on the graphene oxide with an amino group on the aminated spherical thermal-conductive functional particle, so as to obtain a three-dimensional (3D) graphene particle; and (3) depositing a vulcanizing agent on the 3D graphene particle to obtain a vulcanizing agent-modified graphene particle, wherein the vulcanizing agent is adsorbed on a surface of the 3D graphene particle through π-π conjugation;

wherein the spherical thermal-conductive functional particle is selected from the group consisting of aluminum oxide, silicon carbide, silicon dioxide, aluminum nitride, magnesium oxide, and a combination thereof.

2. A method for preparing a vulcanizing agent-modified graphene particle through an in-situ chemical deposition process, comprising:

(1) aminating a spherical thermal-conductive functional particle to obtain an aminated spherical thermal-conductive functional particle;

(2) coating graphene oxide on a surface of the aminated spherical thermal-conductive functional particle through chemical bonding of a carboxyl group and a hydroxyl group on the graphene oxide with an amino group on the aminated spherical thermal-conductive functional particle, so as to obtain a 3D graphene particle; and (3) depositing a vulcanizing agent on the 3D graphene particle to obtain a vulcanizing agent-modified graphene particle, wherein the vulcanizing agent is adsorbed on a surface of the 3D graphene particle through I-x conjugation;

wherein step (1) is performed through steps of:

adding a spherical thermal-conductive functional particle into an alkaline solution followed by a reaction at 70-120° C. for 8-24 h to obtain a hydroxylated spherical thermal-conductive functional particle; subjecting a silane coupling agent having a terminal amino group to hydrolysis to convert an alkyl group to an alcoholic hydroxyl group, so as to obtain a hydrolyzed silane coupling agent; mixing the hydroxylated spherical thermal-conductive functional particle with the hydrolyzed silane coupling agent, and reacting an alcoholic hydroxyl group of the hydrolyzed silane coupling agent with a hydroxyl group on a surface of the hydroxylated spherical thermal-conductive functional particle to graft a terminal amino group-carrying carbon chain of the hydrolyzed silane coupling agent onto the surface of the hydroxylated spherical thermal-conductive functional particle, so as to obtain the aminated spherical thermal-conductive functional particle;

step (2) is performed through steps of:

adding a carboxyl activator and an amidation catalyst into a graphene oxide aqueous dispersion; adding the aminated spherical thermal-conductive functional particle into the graphene oxide aqueous dispersion; and subjecting the amino group on the aminated spherical thermal-conductive functional particle and an activated carboxyl group on a surface of the graphene oxide to amidate to obtain the 3D graphene particle; and step (3) is performed through steps of:

preparing an aqueous dispersion of the 3D graphene particle; dropwise adding a solution of a sulfur-containing compound and a reducing agent at a preset temperature to allow deposition of elemental sulfur on the 3D graphene particle, so as to obtain the vulcanizing agent-modified graphene particle, wherein a carboxyl group and a hydroxyl group on a surface of the 3D graphene particle not only play a role as a nucleus for the precipitation of the elemental sulfur, but also play a role of adsorbing the elemental sulfur, such that the elemental sulfur is deposited in situ on the surface of the 3D graphene particle.

3. The method of claim 2, wherein the sulfur-containing compound is selected from the group consisting of sodium sulfate, sodium thiosulfate, sodium persulfate, disulfur dichloride, sulfur dichloride, sulfur tetrachloride, and a combination thereof.

4. The method of claim 2, wherein a mass ratio of the graphene oxide to the carboxyl activator to the amidation catalyst is 1:0.02:0.02.

5. A method for preparing a controllable crosslinked natural rubber composite, the controllable crosslinked natural rubber composite comprising 100 parts by weight of natural rubber, 1-10 parts by weight of a vulcanizing agent-modified graphene particle, 11 parts by weight of a rubber additive, and 0-120 parts by weight of a reinforcing filler; and the method comprising:

(S1) dispersing the vulcanizing agent-modified graphene particle with deionized water followed by an addition of a natural rubber latex and even mixing to produce a graphene-natural latex mixing system, wherein the vulcanizing agent-modified graphene particle is combined with rubber particles to keep stable due to an electrostatic effect ionized by a negative charge of a protein-phospholipid membrane on the rubber particles; adding a flocculant to the graphene-natural rubber latex mixing system to obtain a graphene-rubber precipitate, wherein a negative charge repulsion between the rubber particles decreases in the presence of the flocculant to trigger flocculation; and the rubber particles with a destroyed protective layer and the vulcanizing agent-modified graphene particle adsorb to each other through T-T interaction, such that composite particles and the rubber particles are agglomerated and precipitated in an ordered manner; and subjecting the graphene-rubber precipitate to washing, dewatering and drying to obtain a vulcanizing agent-modified graphene masterbatch;

(S2) adding a natural rubber block to an internal mixer followed by mixing with an anti-aging agent, an antioxidant, an activator, a softener and the reinforcing filler at a preset temperature for a preset period to obtain a first rubber compound, wherein the anti-aging agent, antioxidant, activator, softener and reinforcing filler are sequentially added;

(S3) transferring the first rubber compound to an open mill followed by mixing sequentially with the vulcanizing agent-modified graphene masterbatch and a vulcanization accelerator and milling until there is no air bubble, so as to obtain a second rubber compound; and (S4) subjecting the second rubber compound to standing for a preset period followed by a vulcanization step to obtain the controllable crosslinked natural rubber composite, wherein rubber molecular chains are crosslinked with sulfur loaded on the vulcanizing agent-modified graphene particle as crosslinking points to form a 3D network structure;

wherein the vulcanizing agent-modified graphene particle is prepared through steps of:

aminating a spherical thermal-conductive functional particle to obtain an aminated spherical thermal-conductive functional particle;

coating graphene oxide on a surface of the aminated spherical thermal-conductive functional particle through chemical bonding of a carboxyl group and a hydroxyl group on the graphene oxide with an amino group on the aminated spherical thermal-conductive functional particle, so as to obtain a 3D graphene particle; and depositing a vulcanizing agent on the 3D graphene particle to obtain a vulcanizing agent-modified graphene particle, wherein the vulcanizing agent is adsorbed on a surface of the 3D graphene particle through x-x conjugation.

6. The method of claim 5, wherein a mass ratio of the anti-aging agent to the antioxidant to the activator to the softener to the vulcanization accelerator is 1:1:5:2:2.

* * * * *